US007450586B2

(12) United States Patent
Davila et al.

(10) Patent No.: US 7,450,586 B2
(45) Date of Patent: Nov. 11, 2008

(54) NETWORK HEADER COMPRESSION ARRANGEMENT (75) Inventors: Hector Ricardo Davila, Phoenix, AZ (US); Craig Thomas Griffin, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 969 days.

(21) Appl. No.: 10/625,296

(22) Filed: Jul. 22, 2003

(65) Prior Publication Data

US 2005/0018666 A1 Jan. 27, 2005

(51) Int. Cl.
*H04L 12/28* (2006.01)
*H04J 3/18* (2006.01)
*H04J 3/24* (2006.01)
*G06F 15/173* (2006.01)

(52) U.S. Cl. .............. 370/393; 370/473; 370/474; 370/477; 709/238

(58) Field of Classification Search ............... 370/389, 370/474, 351, 392, 473, 477
See application file for complete search history.

(56) References Cited

U.S. PATENT DOCUMENTS

| 5,535,199 | A * | 7/1996 | Amri et al. ............ 370/392 |
| 6,314,095 | B1 * | 11/2001 | Loa ..................... 370/352 |
| 6,618,397 | B1 * | 9/2003 | Huang .................. 370/474 |
| 6,765,909 | B1 * | 7/2004 | Sen et al. ............... 370/392 |
| 7,158,491 | B1 * | 1/2007 | Le ....................... 370/328 |
| 2001/0030963 | A1 * | 10/2001 | Yoshimura et al. ...... 370/393 |
| 2001/0048680 | A1 * | 12/2001 | Yoshimura et al. ...... 370/389 |
| 2002/0073227 | A1 * | 6/2002 | Bunn et al. ............ 709/236 |
| 2002/0097701 | A1 * | 7/2002 | Lupien et al. .......... 370/338 |
| 2002/0097722 | A1 * | 7/2002 | Liao et al. ............. 370/392 |
| 2004/0042507 | A1 * | 3/2004 | Pelletier et al. ........ 370/521 |
| 2004/0071096 | A1 * | 4/2004 | Na et al. ............... 370/252 |
| 2004/0081151 | A1 * | 4/2004 | Greis et al. ............ 370/392 |

OTHER PUBLICATIONS

Jacobson, Van. "Compressing TCP/IP Headers for Low-Speed Serial Links" (RFC 1144); Feb. 1990; p. 1-43; http://www.faqs.org/rfcs/rfc1144.html.*

* cited by examiner

*Primary Examiner*—Seema S. Rao
*Assistant Examiner*—Xavier Szewai Wong (57) ABSTRACT For steady state voice data packet transmission between a mobile station and a packet data service node a new compressed TCP/IP header (160) concatenated with a compressed RTP/UDP header (4) is sent. This concatenated header is seven bytes in length instead of the typical 40 byte long RTP/UDP/IP header. A new TCP header arrangement (30) transmits a special access code (161) to a Van Jacobson TCP/IP header compression/decompression arrangement (20). This allows the voice data packet to be transmitted to the receiving end without the other 33 bytes of header information. The PDSN regenerates the IP header and the receiving end then regenerates the RTP/UDP header (205) while it discards the new TCP header arrangement (30).

25 Claims, 8 Drawing Sheets

FIG. 1
100

| SOURCE | DESTINATION PORT |
|---|---|
| LENGTH | CHECKSUM |

*FIG. 2*  110
-PRIOR ART-

| V=2 | P | X | CC | M | PT | SEQUENCE NUMBER |
|---|---|---|---|---|---|---|
| TIMESTAMP ||||||||
| SYNCHRONIZATION SOURCE (SSRC) IDENTIFIER ||||||||
| CONTRIBUTING SOURCE (CSRC) IDENTIFIER ||||||||

| UDP CHECKSUM |||||||
|---|---|---|---|---|---|---|
| MODE | R-PT | M | R-X | CSRC | TSS | TIS |

*FIG. 4*  130
(PRIOR ART)

| PROTOCOL VERSION | HEADER LENGTH | TYPE OF SERVICE | TOTAL LENGTH | | |
|---|---|---|---|---|---|
| PACKET ID ||| D F | M F | FRAGMENT OFFSET |
| TIME TO LIVE || PROTOCOL | HEADER CHECKSUM |||
| SOURCE ADDRESS ||||||
| DESTINATION ADDRESS ||||||

| SOURCE PORT | | | | | | DESTINATION PORT | |
|---|---|---|---|---|---|---|---|
| SEQUENCE NUMBER ||||||||
| ACKNOWLEDGEMENT NUMBER ||||||||
| DATA OFFSET | DATA OFFSET | U | A | P | R | S | F | WINDOW |
| CHECKSUM ||||||| URGENT POINTER |

FIG. 5   140

(PRIOR ART)

NETWORK HEADER COMPRESSION ARRANGEMENT

BACKGROUND OF THE INVENTION

The present invention pertains to network internet protocol and more particularly to a header compression arrangement for wireless network applications.

A prior art method of sending sequencing and timing information to support real time services in internet protocol (IP) networks is by use of the real time protocol (RTP). Network transport for voice is provided by UDP (User Data Protocol) protocol. Wireless IP network applications use vocoded voice. Each vocoded frame is typically 10 to 20 bytes in length of information. The combined RTP/UDP/IP header that is therefore required to be attached to the packet so that the voice frame can reach its destination has a length of about 40 bytes.

The 40 byte combined header is considerable overhead with respect to about 20 bytes of actual voice information for typical wireless vocoder. Sending the combination of 40 bytes of header information with 20 bytes of voice information constitutes an inefficient use of a radio frequency (RF) link.

One approach to the overhead problem is to pack several voice frames together with a single header to improve RF transmission efficiency. However, this approach increases the voice delay significantly. For example, in a CDMA 2000 network, each additional voice frame increases the end to end delay by approximately 60 milliseconds. This produces an unacceptable voice quality.

Voice quality may be further sacrificed to gain bandwidth by using lower bit-rate modes of the vocoder. Again, this is an undesirable situation.

Another approach to the overhead problem is header compression. Available header compression mechanisms are typically designed for generic data compression. Such generic data compression does not take advantage of the peculiar characteristics of voice over packet data. As a result, such header compression techniques perform sub optimally.

Accordingly, it would be highly desirable to have a header compression arrangement for a wireless IP network which makes efficient use of the RF link while providing high quality voice data throughout the network.

DESCRIPTION OF THE PREFERRED EMBODIMENT

Figure 1:
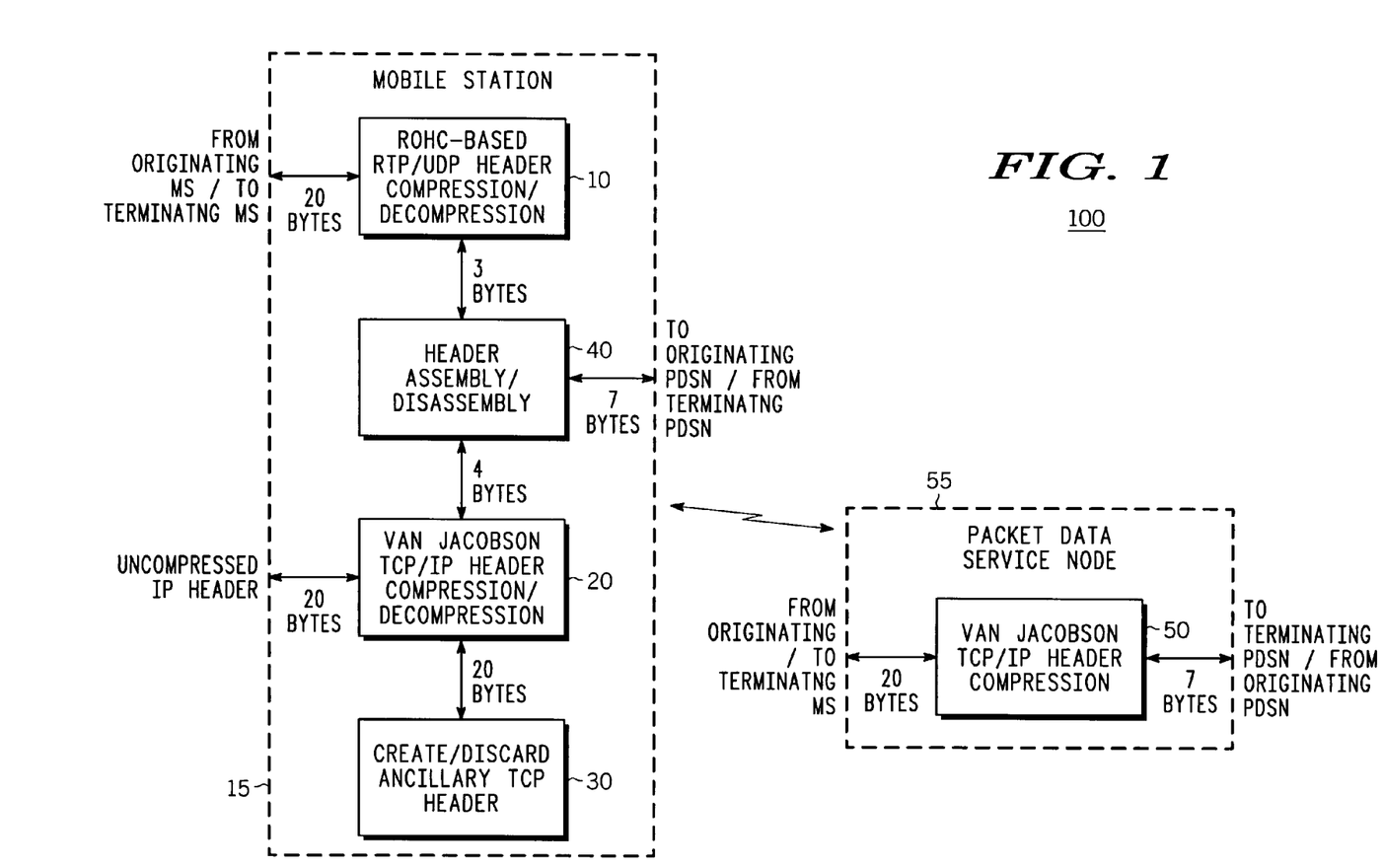
FIG. 1 is a block diagram of a header compression arrangement in accordance with the present invention.

Referring to FIG. 1, a block diagram of a header compression/decompression arrangement in accordance with the present invention is shown. The present invention pertains to voice over internet protocol (IP) for wireless networks, such as 3G and more advanced technology networks which use vocoded voice. Header compression arrangement 100 includes a mobile station 15 and a Packet Data Service Node 55. The mobile station 15 includes a robust header compression (ROHC) based RTP/UDP header compression/decompression unit 10. Header compression/decompression is well known in the art and may be found at IETF RFC 3095 published July 2001.

Figure 2:
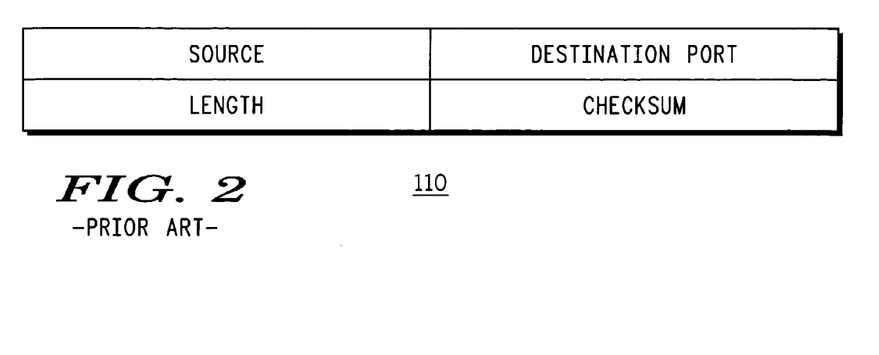
FIG. 2 is a layout of a UDP header from the prior art.

Referring to FIG. 2, A prior art UDP header is shown. The cross-hatch fields of this header, namely source, destination port and length stay constant and are not required to be sent often. A checksum for the header is different for each data set.

Figure 3:
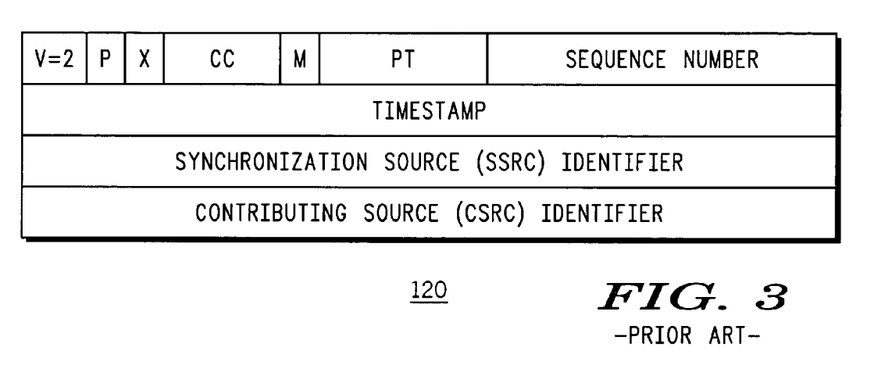
FIG. 3 is a layout of an RTP header from the prior art.

Referring to FIG. 3, a prior art RTP header 120 is shown. As with the UDP header 110, the RTP header 120 has crossed hatch fields which need not be sent every time. Block 10 of FIG. 1 compresses the RTP header to the form shown in FIG. 4.

Figure 4:
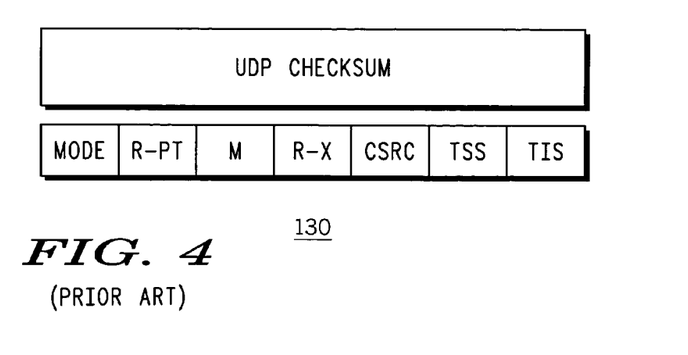
FIG. 4 is a layout of a compressed UDP/RTP header from the prior art.

FIG. 4 depicts the results of the robust header compression of block 10 of FIG. 1. The result of the robust header compression 10 is the three byte data structure 130 shown in FIG. 4. This result includes the UDP checksum (2 bytes) and a summary byte indicating field changes for the RTP portion of the header. A bit of the byte pertains to each of the fields for the RTP header 120.

Figure 5:
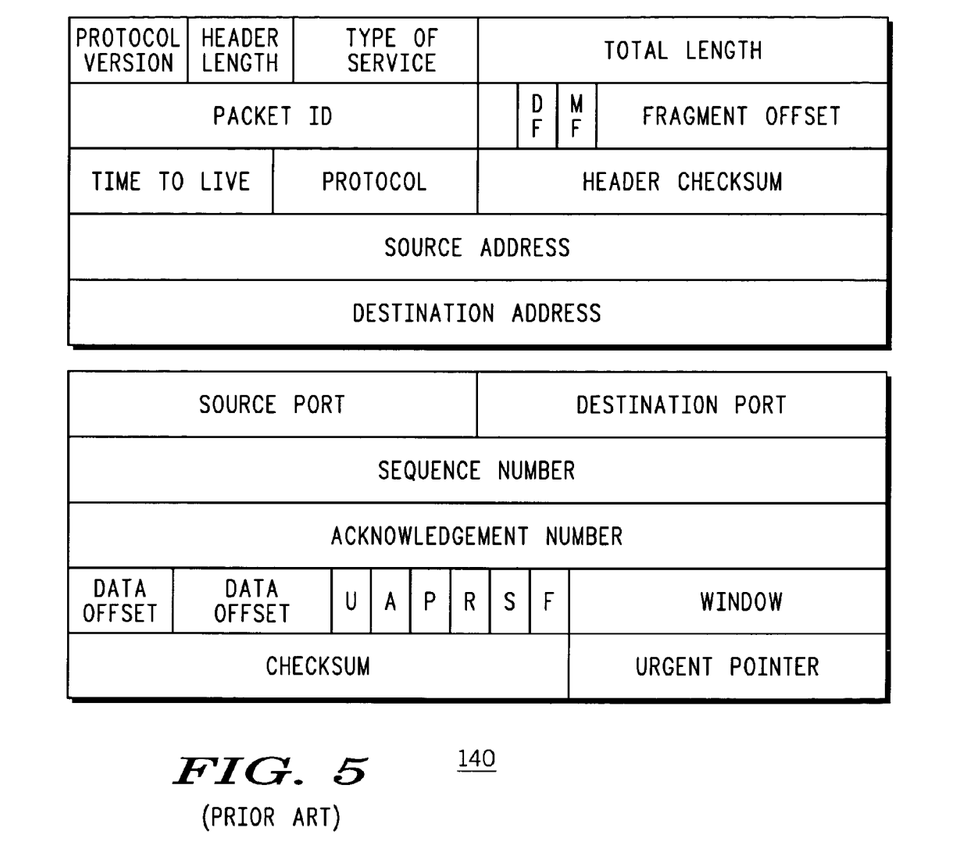
FIG. 5 is a layout of a TCP/IP header from the prior art.

In order to transmit the data packet through the internet protocol portion of the network, the Van Jacobson TCP/IP header compression/decompression 20 is performed. A prior art TCP/IP header 140 is shown in FIG. 5. The Van Jacobson TCP/IP header compression/decompression 20 is well known in the art and was published in the IETF RFC 1144 on February, 1990. Again, the cross-hatched information in the typical TCP/IP header 140 does not change and TCP/IP header compression/decompression 20 does not transmit these after the first packet of data is sent. The TCP/IP header 140 is typically 40 bytes in length. After the compression/decompression 20 is performed, the result is shown in data structure 150 of FIG. 6.

The Van Jacobson TCP/IP header compression further noted that the two byte total length field of data structure 140 and the two byte IP header checksum field were not necessary. Therefore the Van Jacobson method 20 deleted these.

Figure 6:
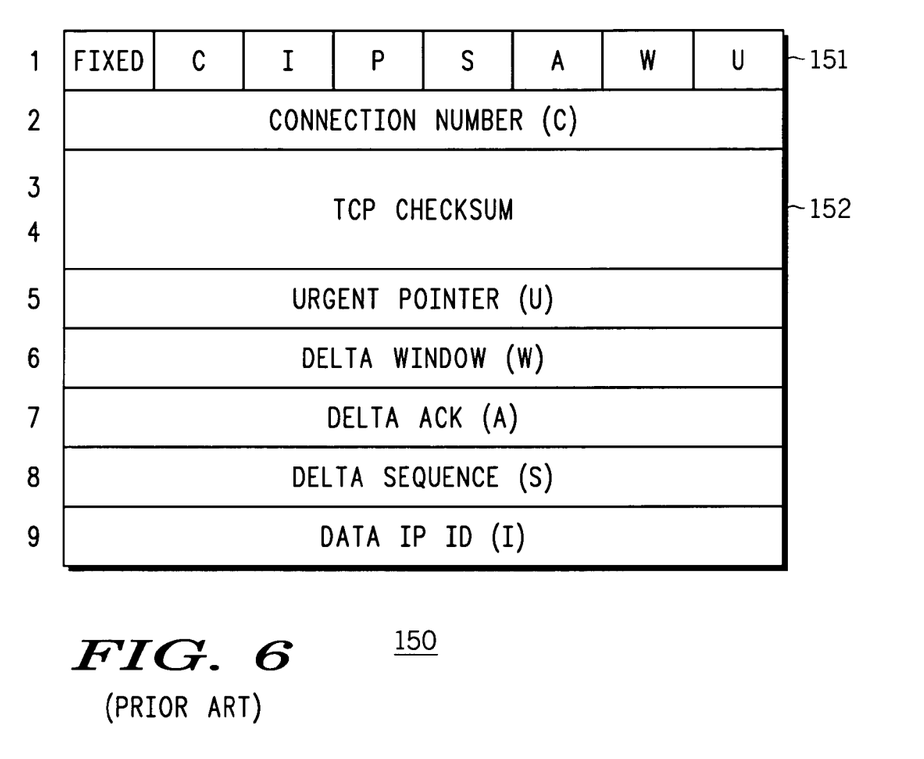
FIG. 6 is a layout of a Van Jacobson compressed TCP/IP header from the prior art.

The Van Jacobson compressor 20 sends uncompressed headers at the beginning of a transmission and in order to resynchronize with decompresses upon detection of corrupted header packets. Otherwise, data structure 150 of FIG. 6 is sent. This data structure includes a mask byte 151. The mask byte 151 indicates which of the data fields in the remainder of the data structure has changed. A "one" may be used to indicate the change. Further, a TCP checksum 152 is included in the data structure 150. Also included are six other parameters from the typical TCP/IP header of 140 of FIG. 5.

Since the receiving end and the transmitting end of the header compression arrangement 100 may be either a mobile station or a Packet Data Service Node (PDSN) both the PDSN 55 and the mobile station 15 must include the compression and decompression methodology. That is both the network and the mobile station must be able to transmit and receive voice data and therefore are required to have the compressor and decompressor. In the PDSN 55, a compressor/decompressor 50 performs a decompression function decompresses an IP (internet protocol) portion of the header for processing throughout the wireline portion of the wireless internet.

The receiving end of the voice data packet, whether it is the PDSN or mobile station, saves a copy of the last non-compressed header for each flow along with a flow identifier. Further, for each of the compressed headers that are sent from the transmitting end to the receiving end, the decompression methodology regenerates the IP header checksum. Further, the decompressor fills in the remaining bytes saved from the last non-compressed TCP/IP header.

The robust header compressor 10 transmits three bytes to header assembly 40. Typically Van Jacobson compressor 20 would transmit the nine byte data structure 150 to header assembly 40.

The present invention includes new or ancillary TCP header 30. New TCP header 30 uses the standard Van Jacobson TCP/IP header compression method to compress IP headers through a radio access network. Ancillary TCP header 30 adds a "new" TCP header to each internet protocol header.

Figure 7:
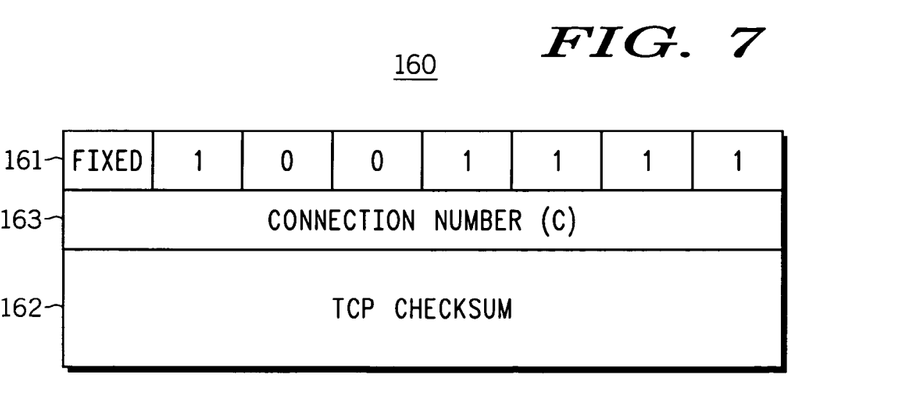
FIG. 7 is a layout of a compressed header in accordance with the present invention.

The new or ancillary TCP/IP header 160 is shown in FIG. 7. It includes a first byte 161, a connection identification 163, and a TCP checksum of two bytes 162. The specific bit values in the first byte 161 are shown. The leftmost bit is always fixed and therefore is not of concern to this methodology. The other seven bits have a specific value of zero or one. The rightmost four bits of byte 161 being set equal to one, as shown in FIG. 7, indicate to the Van Jacobson method 20 that the encoding is to be performed for a special case, that being a unidirectional data transfer.

The connection identification (id) 163 is optional to the extent that if the physical connection supports a single packet flow, the connection id does not have to be resent.

Standard gateway equipment (not shown) which supports the Van Jacobson methodology believes that it is dealing with a normal TCP/IP type connection. Only the end points such as the mobile station and PDSN are aware that this is not a typical TCP/IP connection and involves a new or ancillary TCP header.

In the data structure 160 of FIG. 7 the bits indicate, for a zero no change in the particular field and for one a change in the particular field. The four rightmost bits of byte 161 all being set to one indicate the unidirectional data transfer special case. Since the new TCP header indicates a constant sequence number field change, the four bits from the right being always set, the change is always the same and therefore the sequence field is not transmitted as part of the header.

For the Van Jacobson methodology the specific bit values in the first byte 161 disables the error recovery procedure, also known as "resynchronization," of the Van Jacobson method 20. That is, the error recovery is not needed for voice packets since voice processing applications at the network ends simply discard any corrupted voice packets. Further, when the new TCP header is being decompressed, it is not discarded until the TCP protocol header is reconstructed, that is added back in at the receiving end to form the uncompressed (or original) TCP header.

As a result of using the new TCP header arrangement, further IP header compression is obtained over the Van Jacobson methodology by using the Van Jacobson method in a special case unidirectional data transfer mode. Further, the new TCP header is disregarded by each of the end point receivers once the true TCP/IP header is reconstructed as shown in FIG. 5. Lastly, full 20 byte TCP/IP headers are transmitted only upon startup. For the steady state case, which is other than these two events, the typical 20 byte TCP/IP header has been shortened to a mere four bytes.

Figure 8:
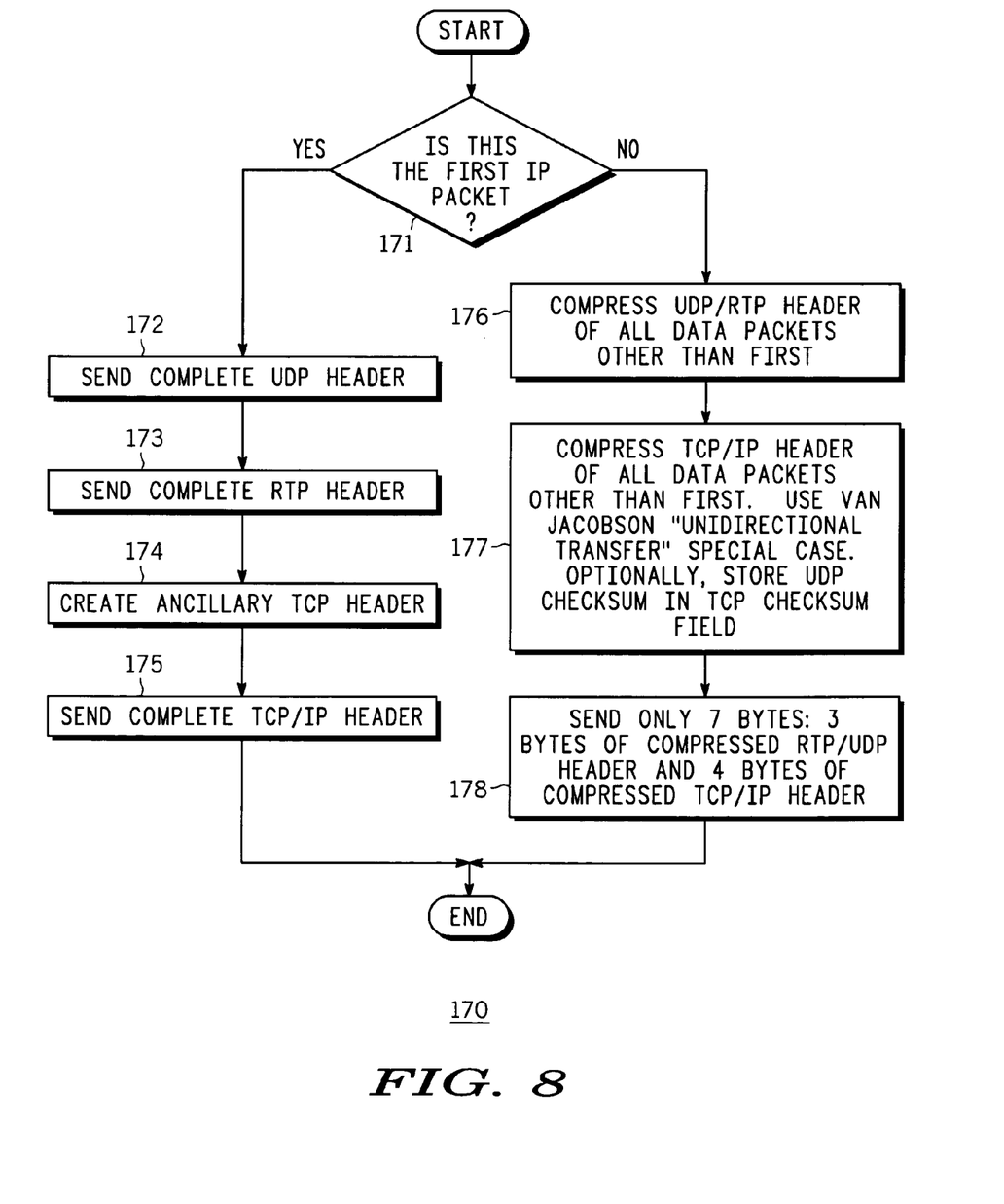
FIG. 8 is a flowchart of mobile station header compression in accordance with the present invention.

Referring next to FIG. 8 the methodology 170 for the mobile station compression for new TCP header 160 is shown in flowchart form. The mobile station process 170 is begun for the header compression and the start block enters block 171. Block 171 determines whether the present data packet is the first data packet for the call. If the packet is the first data packet block 171 transfers control to block 172 via the yes path. Block 172 sends the complete UDP header. For all other voice data packets the new TCP header 160 which comprises four bytes is sent along with the voice data to the receiving end. Again, the Van Jacobson method 20 is guided by the ancillary TCP header 30 to believe that a unidirectional data transfer is being sent with the header marked as described by byte 161.

Next, block 173 sends a complete RTP header only for a first voice data packet. Again for all other voice data packets the compressed header 160 is transmitted by ancillary TCP header 30.

Then, block 174 creates the new or ancillary header 160. Next, block 175 sends the complete TCP/IP header. This is the typical TCP/IP header 140 shown if FIG. 5.

If the present data packet is not the first data packet of the call, then block 171 transfers control to block 176 via the no path. Block 176 compresses the UDP/RTP header to 3 bytes as discussed for block 10, above. Next, block 177 sends the created new header to block 20 as a unidirectional transfer special case. The ancillary or new TCP header is produced which includes the bit pattern shown in byte 161. This particular bit pattern indicates to the Van Jacobson method 20 that it is a special case which is a unidirectional data transfer and bypasses the error mechanisms of the Van Jacobson methodology 20. The UDP checksum is stored in TCP checksum for further compression of the RTP/UDP header. Lastly, block 178 sends the four byte ancillary header with one byte of the three byte compressed RTP/UDP header to PDSN 55.

The mask byte 161 indicates the particular special case for unidirectional data transfer, that is, the rightmost four bits set equal to one. Transmit compression process 170 is then ended.

Figure 9:
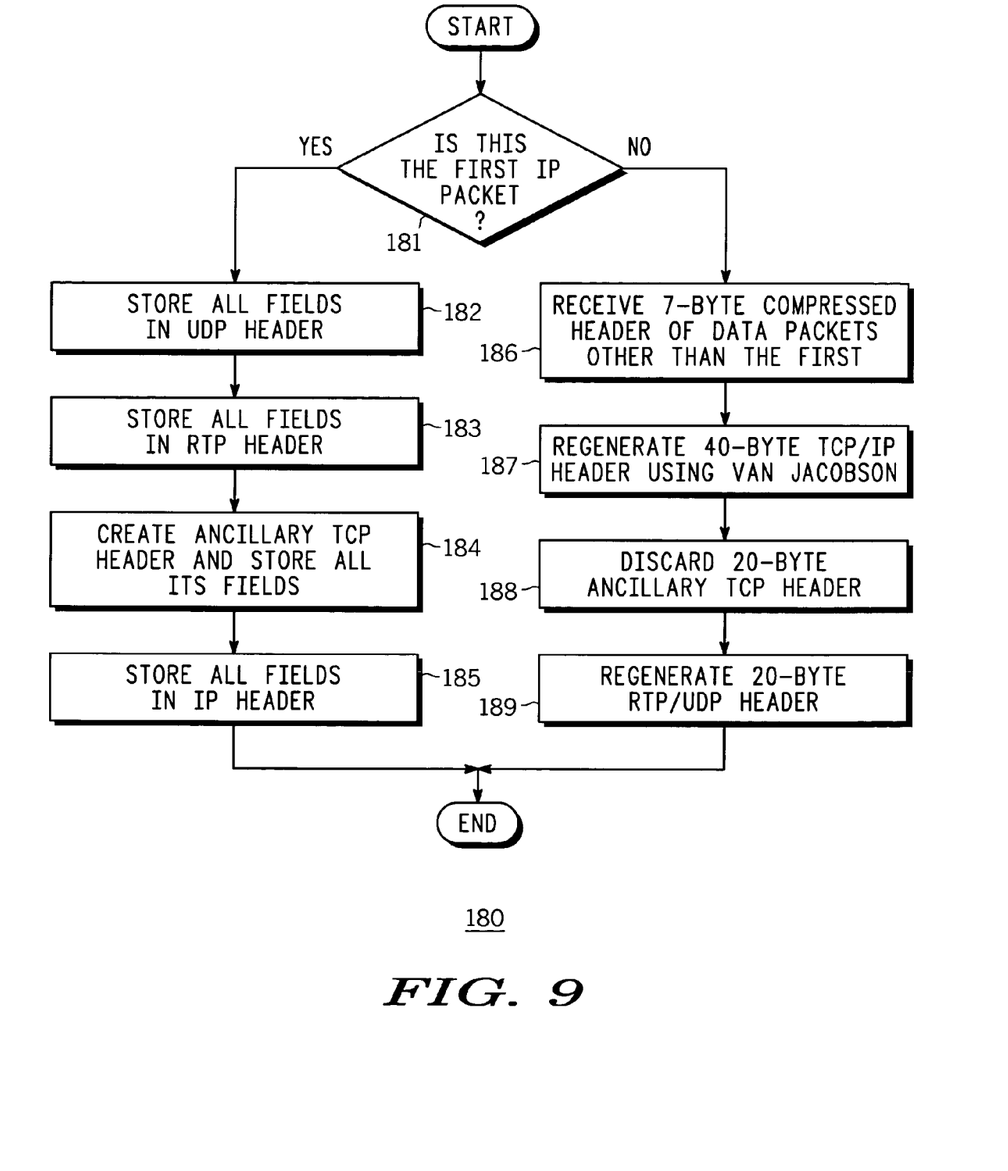
FIG. 9 is a flowchart of mobile station header decompression in accordance with the present invention.

On the receive end or decompression the mobile station receive process 180 is performed. Again, both mobile station and the network PDSN must include a receive process and a transmit process.

The process is started and block 181 is entered. Block 181 determines whether the present data packet is the first data packet of the call. If it is the first packet, then block 181 transfers control to block 182 via the yes path. Block 182 stores all the fields of the UDP header as shown in FIG. 2. That is, all the fields which are cross hatched in FIG. 2 are stored by the mobile station. For the UDP header 110, these fields are the source, destination port and length.

Next, block 183 stores all the non-recurring information included in the RTP header of the first voice data packet. This includes the information in the RTP header 120 which is cross hatched in FIG. 3; namely, the PT field and the synchronization source identifier.

Next, the mobile unit stores all the non-recurring information included in the TCP/IP header of the first voice data packet, block 184. The fields of TCP/IP header 140 that are stored include the protocol version, header length, type of service, DF field, MF field, fragment offset, time to live field, protocol, source address, destination address, source port, destination port, data offset 1 and 2, A field, R field, S field and F field. These fields are the cross hatched fields shown in FIG. 5. Then, block 184 creates the ancillary header. Lastly, block stores all the fields in an IP header.

If the present data packet is not the first data packet, then block 181 transfers control to block 186 via the no path. Block 186 receives the seven byte header (RTP/UDP-TCP/IP). Block 187 regenerates the 40-byte TCP/IP header shown in FIG. 5. Block 188 then discards the ancillary or new TCP header.

Block 189 then regenerates the RTP/UDP header which is 20 bytes. The UDP header 110 is shown in FIG. 2. The RTP header 120 is shown in FIG. 3. The process 180 is then ended.

Figure 10:
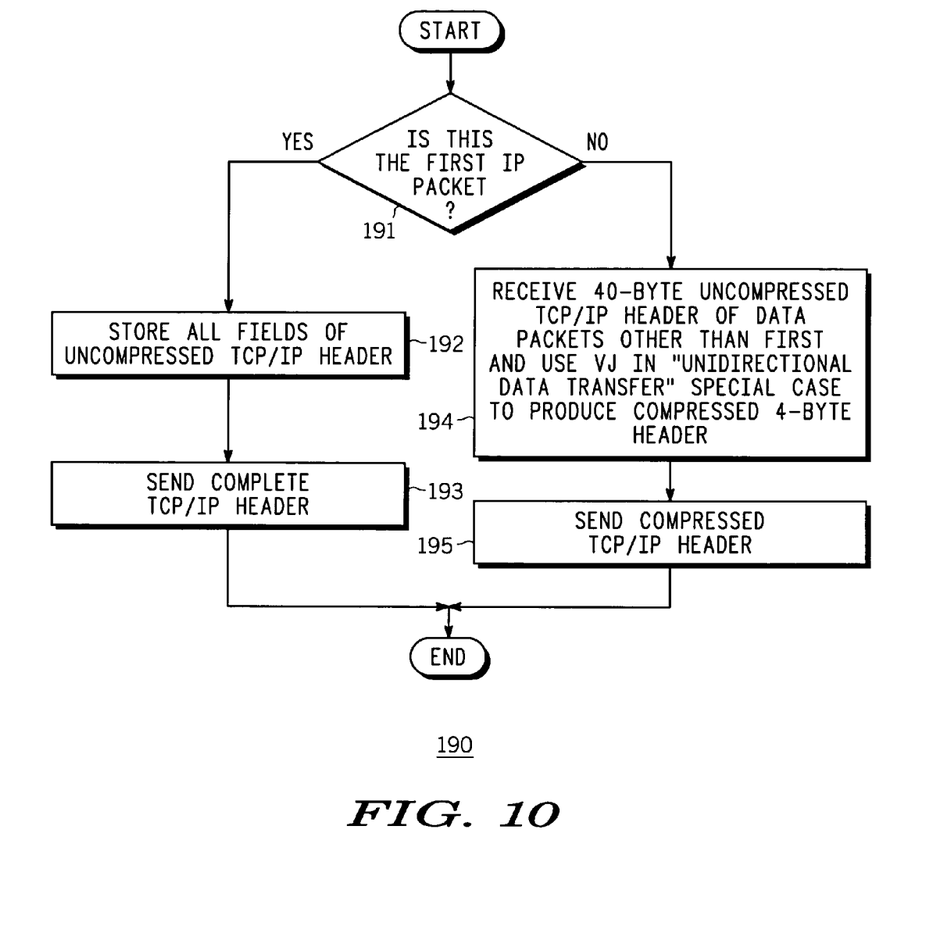
FIG. 10 is a flowchart of packet data service node header compression in accordance with the present invention.

FIG. 10 depicts the compression process 190 for use by the PDSN 55. Process 190 is started and block 191 is entered. Block 191 determines whether the present block is the first IP packet of the call. If it is the first packet, block 191 transfers control to block 192 via the yes path. Block 192 stores all the fields of the uncompressed TCP/IP header. Then block 193 sends a complete TCP/IP header and process 190 is ended.

If the present data packet is not the first data packet, then block 191 transfers control to block 194 via the no path. Block 194 uses the Van Jacobson method to compress the 40 byte TCP/IP header to the new or ancillary 4-byte header shown in FIG. 7. The unidirectional transfer special cases is used by Van Jacobson TCP/IP header compression 50 to accomplish this. Lastly, block 195 sends the new or ancillary TCP/IP header to a mobile station. The process is then ended.

Figure 11:
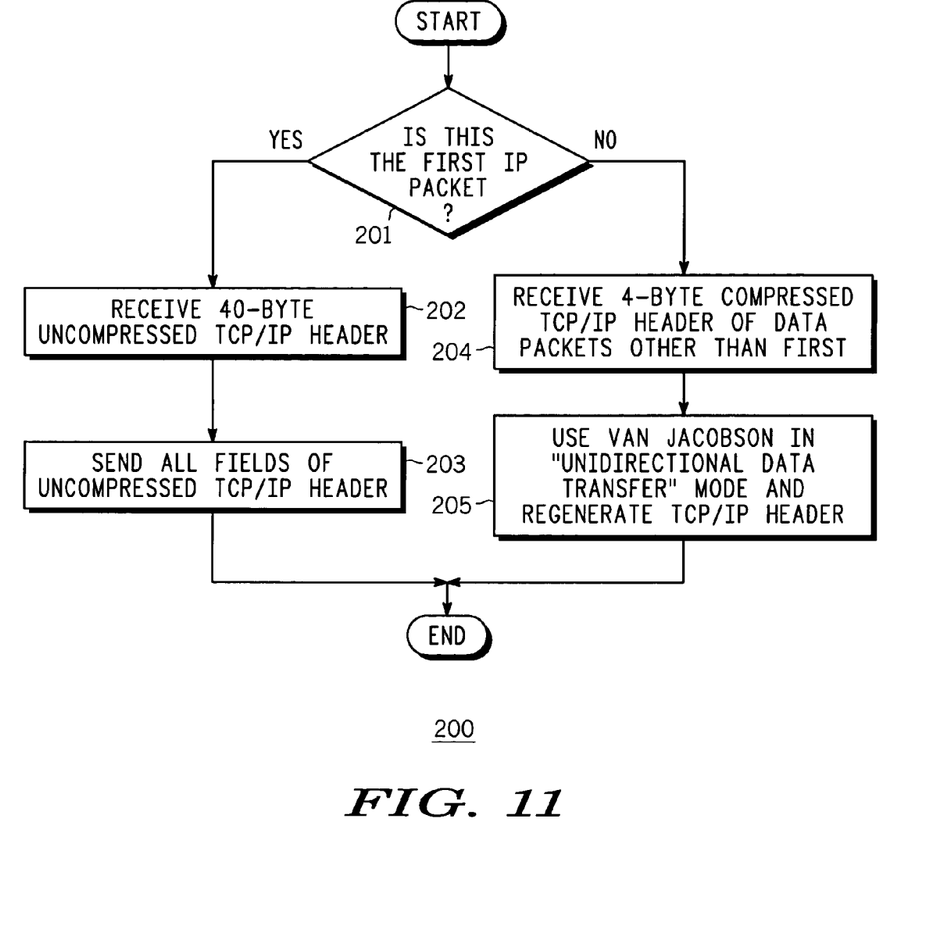
FIG. 11 is a flowchart of packet data service node header decompression in accordance with the present invention.

FIG. 11 depicts the decompression process 200 for use by the PDSN 55. Process 200 is started and block 201 is entered. Block 201 determines whether the present block is the first IP packet of the call. If it is the first packet, block 201 transfers control to block 202 via the yes path. Block 202 receives the 40-byte uncompressed TCP/IP header. Then block 203 sends the complete 40-byte uncompressed TCP/IP header and process 200 is ended.

If the present data packet is not the first data packet, then block 201 transfers control to block 204 via the no path. Block 204 receives the new or ancillary 4-byte header shown in FIG. 7. Lastly, block 195 uses the unidirectional data transfer special cases of by Van Jacobson TCP/IP header compression 50 to regenerate the complete TCP/IP header of FIG. 5. The process is then ended.

A full 40 bytes of headers is still sent initially. 20 bytes are the combined UDP/RTP headers and 20 bytes are the TCP/IP headers. For voice data packets other than the initial, the four byte compressed TCP/IP header 160 is sent by the transmitting end and full TCP/IP header is reconstructed at the receiving end. Thus for the great majority of voice data packets 16 bytes of the 20 byte TCP/IP header are saved. This greatly enhances RF link utilization and bandwidth. This represents approximately an 80% savings in header overhead information which is required to be transmitted from the receiving to transmitting ends.

Although the preferred embodiment of the invention has been illustrated, and that form described in detail, it will be readily apparent to those skilled in the art that various modifications may be made therein without departing from the spirit of the present invention or from the scope of the appended claims.

The invention claimed is:

1. In a packet data communication system, a header compression method comprising the steps of:
    providing by a transmitting unit a Van Jacobson TCP/IP compressor/decompressor;
    determining if whether a data packet is a first data packet of a call;
    if the data packet is the first data packet of a call, generating by the transmitting unit a TCP header;
    if the data packet is not the first packet, concatenating by the transmitting unit a compressed RTP header and a compressed UDP header with the TCP header; and
    sending by the transmitting unit the TCP header to/from the Van Jacobson compressor/decompressor as a unidirectional data transfer.

2. In a packet data communication system, a header compression method as claimed in claim 1, wherein there is further included steps of:
    if the data packet is not the first data packet, performing by the transmitting unit the step of sending the TCP header.

3. In a packet data communication system, a header compression method as claimed in claim 2, wherein there is further included a step of setting by the transmitting unit a predetermined bit pattern in the first byte of the TCP header to indicate the unidirectional data transfer.

4. In a packet data communication system, a header compression method as claimed in claim 2, wherein there is further included a step of providing by the transmitting unit a connection identification in the TCP header.

5. In a packet data communication system, a header compression method as claimed in claim 2, wherein there is further included a step of providing by the transmitting unit a TCP checksum in the TCP header.

6. In a packet data communication system, a header compression method as claimed in claim 5, wherein there is further included a step of providing by the transmitting unit a UDP checksum in place of the TCP checksum in the TCP header.

7. In a packet data communication system, a header compression method as claimed in claim 2, wherein there is further included a step of compressing by the transmitting unit a UDP header and a RTP header.

8. In a packet data communication system, a header compression method as claimed in claim 2, wherein if the data packet is the first data packet, there is further included a step of sending by the transmitting unit a complete UDP header for a first data packet.

9. In a packet data communication system, a header compression method as claimed in claim 8, wherein there is further included a step of sending by the transmitting unit a complete RTP header for a first data packet.

10. In a packet data communication system, a header compression method as claimed in claim 8, wherein there is further included a step of sending by the transmitting unit a complete TCP/IP header for a first data packet.

11. In a packet data communication system, a header compression method as claimed in claim 1, wherein there is further included steps of:
    if the data packet is the first data packet, storing by a receiving unit information of a UDP header.

12. In a packet data communication system, a header compression method as claimed in claim 11, wherein there is further included a step of storing by the receiving unit information of a RTP header.

13. In a packet data communication system, a header compression method as claimed in claim 11, wherein there is further included a step of storing by a receiving unit information of a TCP/IP header.

14. In a packet data communication system, a header compression method as claimed in claim 11, wherein there is further included a step of storing by the receiving unit information in an IP header.

15. In a packet data communication system, a header compression method as claimed in claim 1, wherein there is further included steps of:

if the data packet is not the first data packet, receiving by a receiving unit the TCP header and a compressed UDP header and RTP header.

16. In a packet data communication system, a header compression method as claimed in claim 15, wherein there is further included a step of regenerating the UDP header.

17. In a packet data communication system, a header compression method as claimed in claim 15, wherein there is further included a step of regenerating the RTP header.

18. In a packet data communication system, a header compression method as claimed in claim 15, wherein there is further included a step of regenerating the TCP/IP header.

19. In a packet data communication system, a header compression method as claimed in claim 15, wherein there is further included a step of discarding the TCP/IP header.

20. In a packet data communication system, a header compression method as claimed in claim 1, wherein:
   the transmitting unit is a mobile station; and
   the receiving unit is a packet data service node.

21. In a packet data communication system, a header compression method as claimed in claim 1, wherein:
   the transmitting unit is a packet data service node; and
   the receiving unit is a mobile station.

22. In a packet data communication system, a header compression method as claimed in claim 1, wherein determining whether a data packet is a first data packet of a call being performed by a packet data service node; and
   if the data packet is not the first data packet performing steps of:
      receiving by the packet data service node an uncompressed TCP/IP header; and
      sending by the packet data service node the TCP/IP header.

23. In a packet data communication system, a header compression method as claimed in claim 22, wherein if the data packet is the first data packet there is further included steps of:
   storing by the packet data service node the uncompressed TCP/IP header; and
   sending by the packet data service node the TCP/IP header.

24. In a packet data communication system, a header compression method as claimed in claim 1, wherein determining whether a data packet is a first data packet of a call being determined by a packet data service node; and
   if the data packet is not the first data packet performing steps of:
      receiving by the packet data service node the TCP/IP header; and
      regenerating by the packet data service node an uncompressed TCP/IP header.

25. In a packet data communication system, a header compression method as claimed in claim 24, wherein if the data packet is the first data packet there is further included steps of:
   receiving by the packet data service node the uncompressed TCP/IP header; and
   storing by the packet data service node the uncompressed TCP/IP header.

* * * * *